R. E. THOMPSON.
DRAFT GAGE.
APPLICATION FILED MAR. 8, 1918.

1,286,447.

Patented Dec. 3, 1918.

WITNESSES
George C. Myers.

INVENTOR
Ross. E. Thompson,

BY
ATTORNEYS

UNITED STATES PATENT OFFICE.

ROSS EMILE THOMPSON, OF DEMING, NEW MEXICO.

DRAFT-GAGE.

1,286,447.  Specification of Letters Patent.  Patented Dec. 3, 1918.

Application filed March 8, 1918. Serial No. 221,230.

*To all whom it may concern:*

Be it known that I, ROSS E. THOMPSON, a citizen of the United States, and a resident of Deming, in the county of Luna and State of New Mexico, have invented new and useful Improvements in Draft-Gages, of which the following is a specification.

My invention is an improvement in draft gages, and has for its object to provide a gage of the character specified, especially adapted for use with a furnace or other heater, for indicating the pressure in the combustion chamber and in the stack, to permit the fire to be regulated to maintain a given reading on the scale of the gage.

Figure 1:
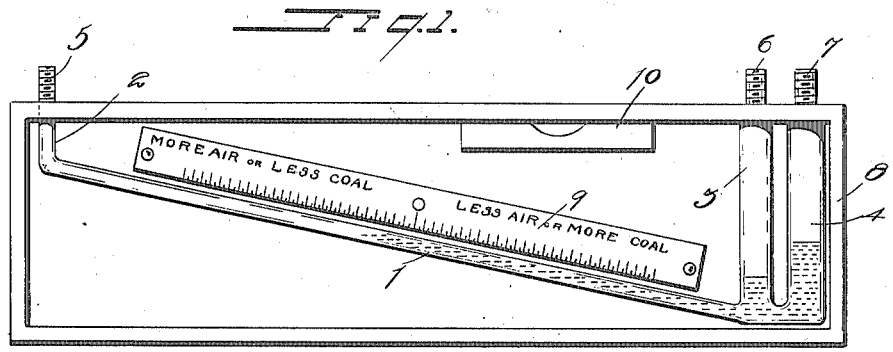
Figure 1 is a front view of the improved gage.
Figure 2:
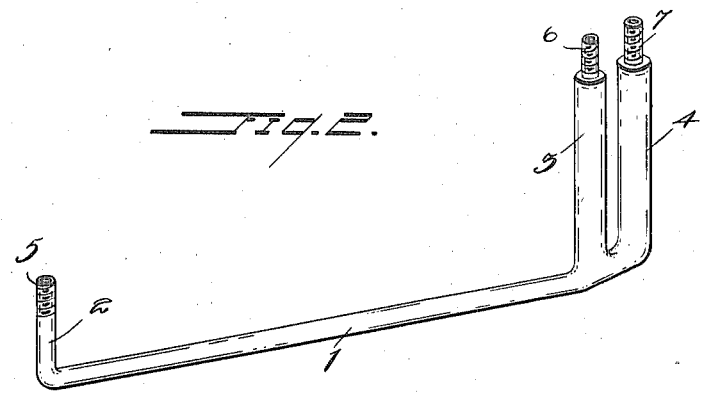
Fig. 2 is a perspective view of the tube removed.

In the present embodiment of the invention, a tube 1 is provided for containing a suitable liquid, and the said tube has at one end an upstanding leg 2 and at the other end two upstanding legs 3 and 4. The leg 2 is threaded at its extremity, as indicated at 5, and the legs 3 and 4 have reduced threaded metal nipples 6 and 7, respectively, held in the legs in any suitable manner to permit the said legs 2, 3 and 4 to be connected to pipes of a suitable character for a purpose to be presently set forth.

The tube 1 is arranged within a suitable supporting frame 8 and in inclined position, as shown in Fig. 1, and the legs 2, 3 and 4 are so arranged with respect to the tube that these legs will be vertical when the tube is placed in the inclined position shown, that is, inclining downward from the leg 2 to the legs 3 and 4.

A plate 9 is held in the frame which is above the tube 1, and this plate carries a scale, having a central graduation indicating zero and other graduations on each side of the zero mark. On each side of the zero mark is a legend, that above the mark reading "more air or less coal" and that below the mark reading "less air or more coal".

A spirit level 10 is held by the frame above the gage tube for indicating the proper placing of the gage, and the leg 2 of the gage is connected by suitable pipes with the combustion chamber of the furnace. The leg 3 is connected to the stack near the damper, and the leg 4 to the ash pit, or it may be left open to the atmosphere. The improved gage will indicate on one scale the relation between the pressure at the three points named.

I claim:

1. A pressure gage comprising a transparent tube and means whereby the same is supported with its axis inclined to the horizon, said tube being adapted to contain a liquid and having two upstanding legs at one end and one upstanding leg at the other end, said legs being adapted for connection to different sources of pressure.

2. A pressure gage comprising an inclined tube adapted to contain a liquid and having a plurality of upstanding legs at one end and one upstanding leg at the other end, said legs being adapted for connection to different sources of pressure, and said tube having a transparent portion for permitting the level of the liquid to be observed.

ROSS EMILE THOMPSON.

Witnesses:
M. E. DE FRANCE,
H. DIAL.